(12) United States Patent
Ikegashira

(10) Patent No.: US 11,932,269 B2
(45) Date of Patent: Mar. 19, 2024

(54) CONTROL SYSTEM

(71) Applicant: Mitsubishi Electric Corporation, Tokyo (JP)

(72) Inventor: Toshiki Ikegashira, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/919,935

(22) PCT Filed: May 28, 2020

(86) PCT No.: PCT/JP2020/021033
§ 371 (c)(1),
(2) Date: Oct. 19, 2022

(87) PCT Pub. No.: WO2021/240700
PCT Pub. Date: Dec. 2, 2021

(65) Prior Publication Data
US 2023/0174082 A1     Jun. 8, 2023

(51) Int. Cl.
*B60W 50/035* (2012.01)
*B60W 50/04* (2006.01)

(52) U.S. Cl.
CPC ........ *B60W 50/035* (2013.01); *B60W 50/045* (2013.01)

(58) Field of Classification Search
CPC . B60W 50/035; B60W 50/045; G06F 21/554; G06F 21/552
See application file for complete search history.

(56) References Cited

U.S. PATENT DOCUMENTS

2017/0088164 A1* 3/2017 Kobayashi .......... G06F 11/0757

FOREIGN PATENT DOCUMENTS

| JP | 5365273 B2 | 12/2013 |
| WO | 2019/159615 A1 | 8/2019 |
| WO | WO2019159615 A1 * | 8/2019 |

OTHER PUBLICATIONS

International Search Report for PCT/JP2020/021033 dated Sep. 1, 2020 [PCT/ISA/210].

* cited by examiner

*Primary Examiner* — Brian P Sweeney
(74) *Attorney, Agent, or Firm* — Sughrue Mion, PLLC; Richard C. Turner

(57) ABSTRACT

In a control process of a control device of a vehicle, normal-case information and execution-case information are compared, and if at least either compared execution orders of a calculation process or compared output values in steps of the calculation process are different from each other, it is judged that abnormality has occurred, thus providing a control system that enables normal traveling by detecting abnormality in the vehicle even if an unknown cyberattack is performed during traveling.

21 Claims, 10 Drawing Sheets

CONTROL SYSTEM

CROSS REFERENCE TO RELATED APPLICATIONS

This application is a National Stage of International Application No. PCT/JP2020/021033 filed May 28, 2020.

TECHNICAL FIELD

The present disclosure relates to a control system.

BACKGROUND ART

In recent years, an on-vehicle system of an automobile has become connectable with an external device via a network, so that there is a risk that a malicious third person might intrude into the on-vehicle system from outside via the network. If the malicious third person has intruded into the on-vehicle system, in a control device such as an electronic control unit (ECU) provided to the vehicle, a stored program might be falsified or control of the ECU might be taken over, thus intentionally causing an accident through remote control.

In such an on-vehicle system, an abnormality coping method is adopted, e.g., even if some of devices have failed, abnormality caused by the failure is detected and the function is brought into a fallback state by fail-safe, whereby normal traveling can be performed.

However, as described above, if the program is falsified so that a configuration for detecting abnormality due to failure is changed or information which is a target in abnormal detection is made to pretend to be a normal value, an event that should be originally judged as abnormality becomes less likely to be detected as abnormality.

Regarding such a problem, for example, message authentication or digital signature may be used as technology for security protection. However, these are technologies for coping with a known attack scenario and therefore are not always able to cope with an unknown cyberattack. For example, if communication data is made to pretend to be a normal value, it is difficult to detect the data as abnormality. Therefore, it is necessary to monitor not only communication data but also the behavior of the vehicle or the ECU.

Secure boot is one of measures against an unknown cyberattack. However, since memory check is performed at the time of starting, if an attack is performed during traveling, it is impossible to cope with the attack. If memory check is constantly performed during traveling, there is a problem that the processing load increases. Accordingly, it is necessary to make such a configuration that, even if an unknown cyberattack is performed during traveling, abnormality is detected without greatly influencing the processing load of a control process and thus the vehicle is enabled to travel normally.

Patent Document 1 discloses that, in order to monitor a CPU executing a plurality of processes, the dependency relationship between the plurality of processes is extracted on the basis of the execution conditions of the plurality of processes, and abnormality in operations of the plurality of processes can be detected on the basis of the extracted dependency relationship.

Patent Document 2 discloses that abnormality can be detected when a processing order, an execution condition, an execution timing, a control value, or the like of a function sequence of an electronic control device deviates from a normal state.

CITATION LIST

Patent Document

Patent Document 1: Japanese Patent No. 5365273
Patent Document 2: WO2019/159615

SUMMARY OF THE INVENTION

Problems to be Solved by the Invention

In Patent Document 1, while the execution order and the execution times of the processes are normal, if a processing value included in the process is falsified, abnormality cannot be detected. In addition, since abnormality detection judgment is performed after the plurality of processes are completed, if abnormality has occurred any time during a single process, it takes time until abnormality is detected.

In Patent Document 2, although the processing order and the control value of the function sequence are targeted, an output value for each step of the sequence is not targeted. It is assumed that another new process is added in a step of the sequence by an unknown cyberattack. In this case, while the sequence passes through a normal route and is executed with the original control value, an important value relevant to control in parallel with the above sequence might be processed through the added other new process, and such abnormality cannot be detected. In addition, abnormality that has occurred in a step of the sequence cannot be detected until the sequence is finished.

The present disclosure has been made to solve the above problem, and an object of the present disclosure is to provide a control system that can immediately detect abnormality even during traveling of a vehicle even if an unknown cyberattack is performed, by judging whether or not there is abnormality for each step in a calculation process for calculating a control value for executing a control process.

Solution to the Problems

A control system according to the present disclosure includes: a control unit which executes a control process of a control device; a calculation unit which calculates a control value for the control process through a plurality of steps of a calculation process; a storage unit in which normal-case information about an execution order of the calculation process of the control unit and output values in the steps of the calculation process are stored in advance; an acquisition unit which acquires execution-case information about an execution order of the executed calculation process and output values in the steps of the executed calculation process; a comparison unit which compares the normal-case information and the execution-case information; and a judgment unit which judges that abnormality has occurred, if at least either the compared execution orders of the calculation process or the compared output values in the steps of the calculation process are different from each other.

Effect of the Invention

The control system according to the present disclosure can immediately detect abnormality in a vehicle due to an unknown attack even during traveling of the vehicle, thus enabling the vehicle to travel normally.

BRIEF DESCRIPTION OF THE DRAWINGS

FIG. 4A illustrates operation of a specifying unit, FIG. 4B illustrates operation of a memory examination unit, and FIG. 4C illustrates operation of a rewriting unit.

DESCRIPTION OF EMBODIMENTS

Figure 1:
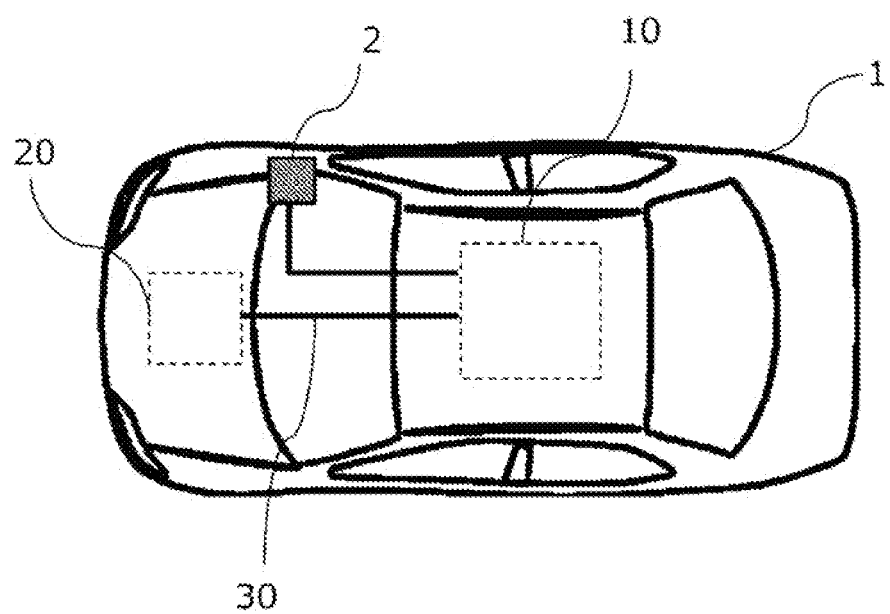
FIG. 1 illustrates a vehicle provided with a control system according to embodiment 1.

Hereinafter, a preferred embodiment of a control system according to the present disclosure will be described with reference to the drawings. In particular, as a specific example of the control system, a case of application to a control system of an on-vehicle control device (ECU) of which control targets are a vehicle and an on-vehicle device will be described in detail. The same or corresponding matters and parts are denoted by the same reference characters, and the detailed description thereof is omitted. Also in the other embodiments, components denoted by the same reference characters will not be repeatedly described.

Embodiment 1

FIG. 1 illustrates a vehicle provided with an ECU (hereinafter, referred to as a control device 10) to which a control system according to embodiment 1 is applied. The control device 10 may be connected to another control device 20 in a vehicle 1 via a communication line 30, e.g., a controller area network (CAN).

Functions in Control Device 10

Figure 2:
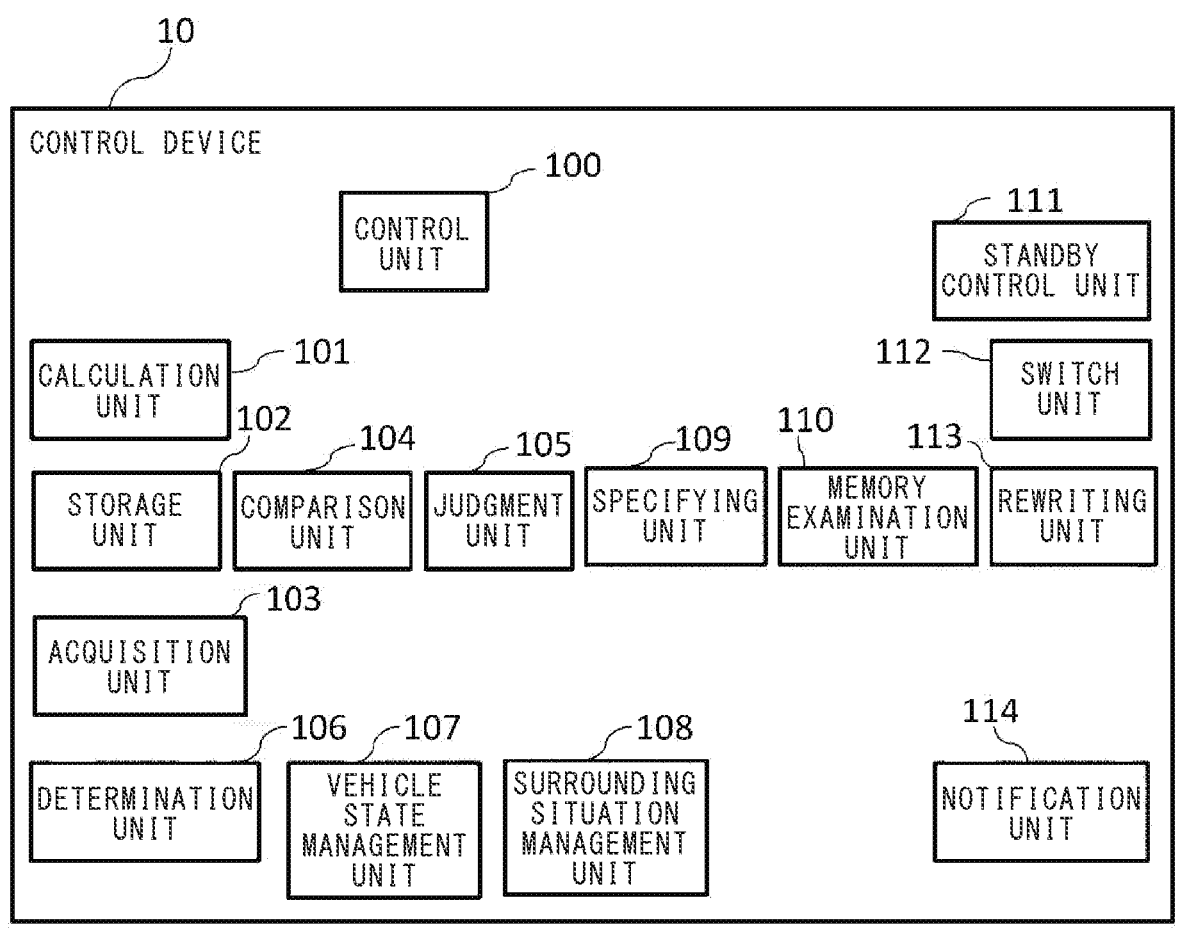
FIG. 2 is a function block diagram of a control device according to embodiment 1.

FIG. 2 is a function block diagram of the control device 10. The control device 10 includes a control unit 100, a calculation unit 101, a storage unit 102, an acquisition unit 103, a comparison unit 104, a judgment unit 105, a determination unit 106, a vehicle state management unit 107, a surrounding situation management unit 108, a specifying unit 109, a memory examination unit 110, a standby control unit 111, a switch unit 112, a rewriting unit 113, and a notification unit 114. Hereinafter, these components will be described in detail.

The control unit 100 has a function of controlling a device that is a control target provided in the vehicle. One or a plurality of control units 100 may be present in the control device 10. A device 2 that is a control target shown in FIG. 1 is an actuator or the like, which will not be described in detail. In the following description, the device 2 that is a control target is simply referred to as a control target 2.

The control unit 100 reads control program data corresponding to the control target 2 from a read only memory (ROM) and a random access memory (RAM), and executes the read program, thereby controlling the control target 2. A plurality of control methods may be present. For example, control may be executed with a control value X for a condition A and with a control value Y for a condition B.

The calculation unit 101 calculates a control value to be used for a control process of the control unit 100. A calculation process for calculating the control value includes a plurality of steps. A plurality of calculation processes may be present. For example, the control value X is calculated through a calculation process C, and the control value Y may be calculated through a calculation process D.

The storage unit 102 stores an execution order of calculation process steps to be used in the calculation unit 101 and an output value for each step, acquired by the acquisition unit 103 described later, in a specific area (here, referred to as "execution-case memory") in the storage unit 102. In addition, the storage unit 102 stores operation programs of the control unit 100 and the calculation unit 101 in a case of normal operation, a control value to be used during the operation, and an output value for each step in the calculation process, in an area (here, referred to as "normal-operation memory 1022") different from the area of the "execution-case memory 1021". The details thereof will be described later with reference to FIG. 4A to 4C.

Information stored in the storage unit 102 may be managed with an encryption key by a hardware security module (HSM). In addition, the information to be stored may be compressed, or for reinforcing security, a result obtained by performing operation on the information to be stored may be stored instead. For example, the information may be stored by encryption or as a hash or a message authentication code (MAC).

The acquisition unit 103 acquires, during execution, an execution order of calculation process steps to be used in the calculation unit 101 and an output value for each step. The acquisition timing may be a timing for each step of the calculation process, or a desired acquisition timing until the calculation process is finished. The acquired execution order of the steps and the acquired output value for each step are stored in the "execution-case memory 1021" of the storage unit 102.

The comparison unit 104 compares the execution order of calculation process steps and the output value for each step during normal operation, stored in advance in the storage unit 102, with the execution order of the calculation process steps and the output value for each step during execution, acquired by the acquisition unit 103. The comparison timing may be a timing for each step, or a desired comparison timing until the calculation process is finished.

The judgment unit 105 judges that abnormality has occurred, if the comparison result of the comparison unit 104 indicates that they are different. That is, judgment that abnormality has occurred may be made in both of a case where either the compared execution orders of the calculation process steps or the compared output values for each step are different from each other and a case where both pairs are respectively different from each other. For the judgment method, not only the execution order of the calculation process steps and the output value for each step, but also other information such as the execution time of the calculation process may be used.

If the judgment unit 105 judges that abnormality has occurred, an abnormality detection process is subsequently performed. If the judgment result is normal, the control process of the control unit 100 continues to be executed.

Figure 3:
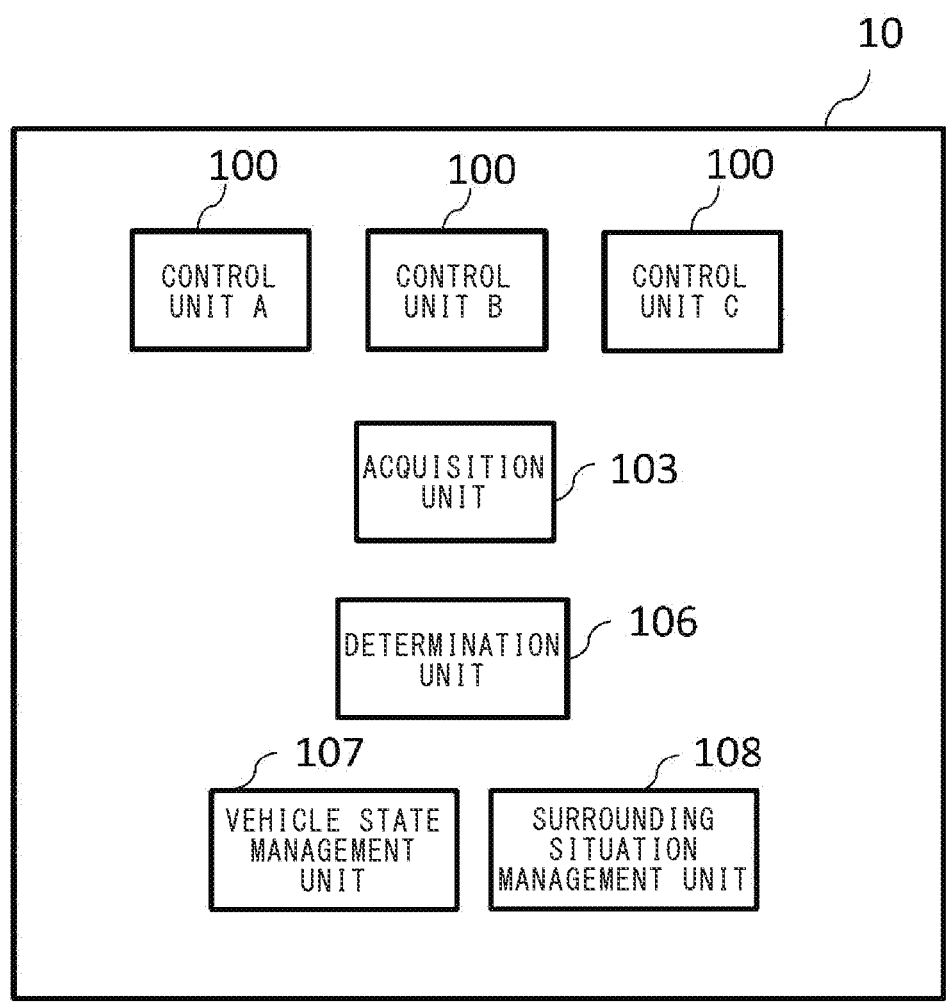
FIG. 3 is another function block diagram of the control device according to embodiment 1.

The determination unit 106 sets priorities indicating which control unit is to be preferentially examined among the plurality of control units of the control device 10. FIG. 3 shows an example of the control device 10 in which a plurality of the control units 100, i.e., control units A to C, are provided. From the determination result of the determination unit 106, the acquisition unit 103 determines the control unit as a target among the control unit A, the control unit B, and the control unit C. In a case where there is only one control unit in the control device 10, priorities are not set.

The determination unit 106 further determines the control unit 100 that should be a target from which the acquisition unit 103 acquires information, on the basis of information from the vehicle state management unit 107 and the surrounding situation management unit 108 described later. Specifically, the determination unit 106 prioritizes control that will greatly suffer a damage influence in a case where the vehicle is taken over by a cyberattack. For example, in a case where the control unit A in FIG. 3 performs processing relevant to "traveling" at the time of sharply increasing the speed, processing relevant to "turning" in congestion, and processing relevant to "stopping" when the weather is snowy, the determination unit 106 determines to prioritize the control unit A.

The vehicle state management unit 107 manages the operation state of the vehicle. The operation state represents a state where the vehicle "travels", "turns", or "stops", for example. The operation state may be acquired from a control device other than the control device 10, e.g., the control device 20 in FIG. 1.

The surrounding situation management unit 108 manages a surrounding situation of the vehicle. The surrounding situation represents a traffic condition such as congestion, or weather such as snowy, for example. The surrounding situation may be acquired from a control device other than the control device 10, e.g., the control device 20 in FIG. 1.

Figure 4A:
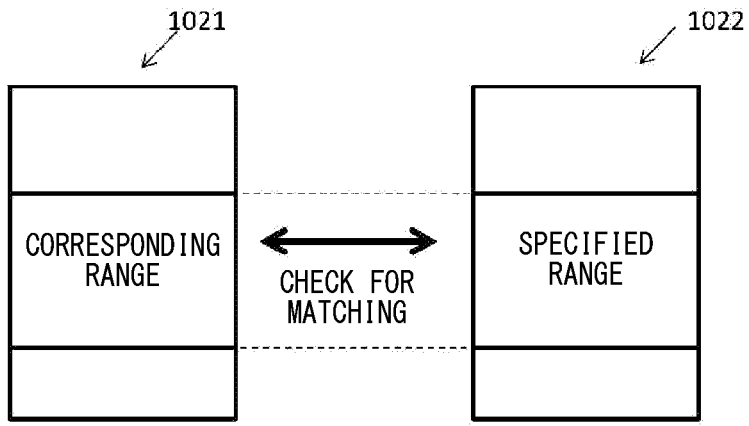
FIGS. 4A, 4B, and 4C illustrate operations from examination to rewriting of memories according to embodiment 1.

If the judgment unit 105 judges that abnormality has occurred, as shown in FIG. 4A, the specifying unit 109 specifies a memory range as a cause for abnormality, from the execution order of the calculation process steps during execution stored in the "execution-case memory 1021" of the storage unit 102. Specifically, a corresponding range in the "execution-case memory 1021" relevant to the executed calculation process, where information acquired from the acquisition unit 103 is stored in the storage unit 102, i.e., stored in the RAM and/or the ROM, is read and specified.

Figure 4B:
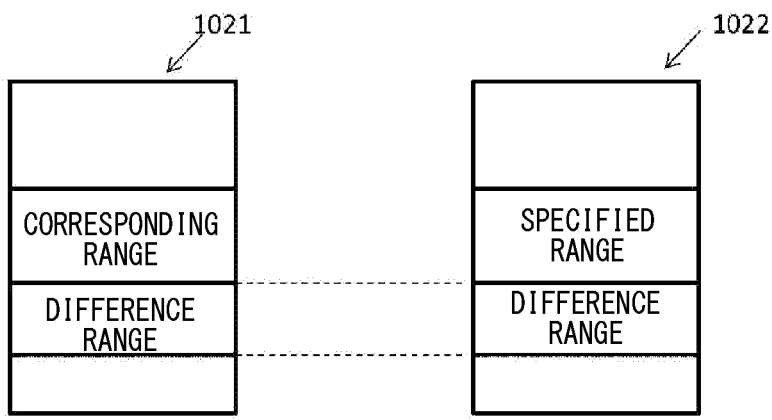

As shown in FIG. 4A, the memory examination unit 110 examines whether or not the corresponding range in the memory specified by the specifying unit 109 matches the "normal-operation memory 1022" stored in advance in the storage unit 102, and detects a range including difference. FIG. 4B shows an example in which a range including difference is detected as a result of examination. As a method for examining memory matching, the memory may be divided and then examined for matching. In addition, memory data may be compressed by, for example, being hashed, to perform examination. For increasing the processing speed, examination may be performed by HSM.

The standby control unit 111 is another control unit separate from the control unit 100 and capable of executing the same control process as the control unit 100. Specifically, the control process of the standby control unit 111 is not executed in a normal control process. The control process is executed only when switch processing is executed by the switch unit 112. For immediately executing after the switching, the standby control unit 111 may be started in advance.

If the judgment unit 105 judges that abnormality has occurred, the switch unit 112 switches the control process of the control unit 100 to the control process of the standby control unit 111. After the switching, the function of the control unit 100 may be stopped or may be executed partially in a fallback state.

Figure 4C:
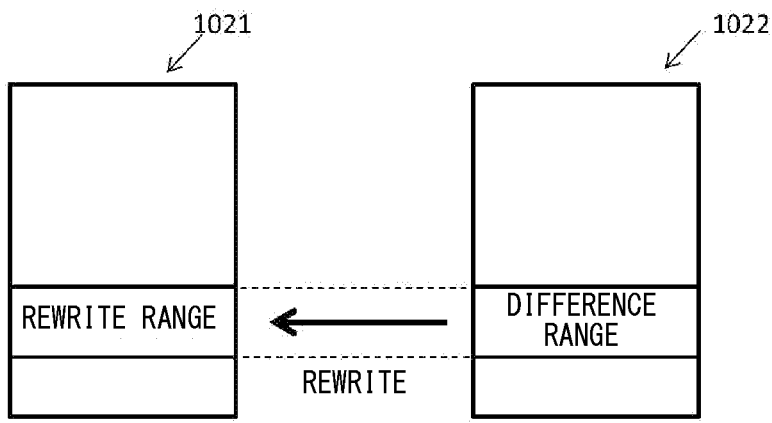

As shown in FIG. 4C, after the switch unit 112 switches the control process of the control unit 100 to the standby control unit 111, the rewriting unit 113 rewrites the difference-included range detected by the memory examination unit 110 from the "normal-operation memory 1022" into the ROM and/or the RAM of the storage unit 102 in which the "execution-case memory 1021" is stored.

The notification unit 114 sends the information indicating judgment as abnormality by the judgment unit 105 and the rewrite result of the rewriting unit 113, to outside of the control device 10. As a notification method, the information indicating judgment as abnormality and the rewrite result may be sent at the same time, or may be sent separately from each other. A notification destination is a driver who is notified through a display screen of a dashboard or the like. Alternatively, a notification destination may be a notification center outside the vehicle. The notification content may be abnormality information, attack information, call for attention, or the like. The notification content may be displayed on the display screen of the dashboard, to indicate, for example, "ABNORMAL", "NORMAL", "ABNORMALITY ADDRESSED", "ATTACKED", "BEWARE OF SPEED", or the like.

Figure 5:
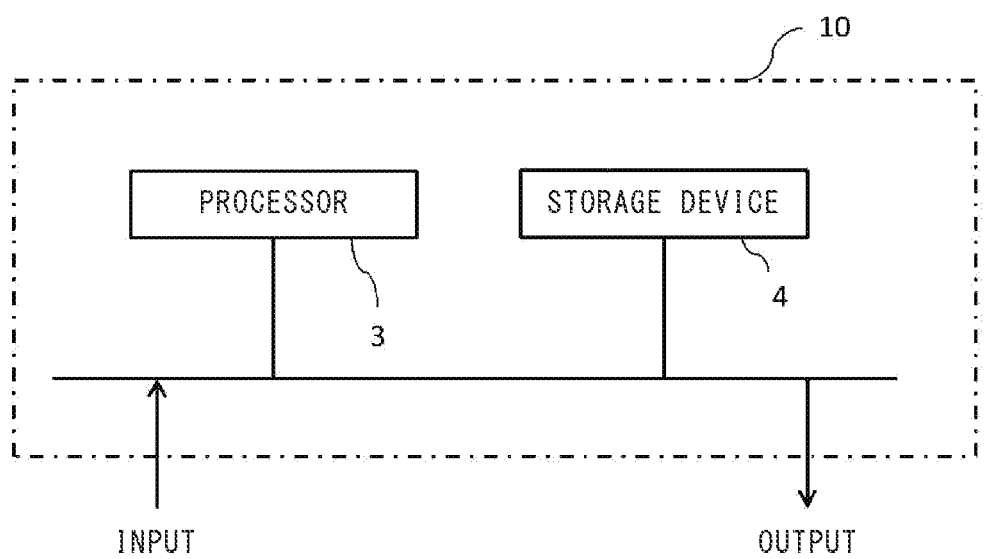
FIG. 5 shows an example of a hardware configuration of a control unit.

FIG. 5 shows an example of hardware of a microcomputer in the control device 10. The control device 10 is composed of a processor 3 and a storage device 4, and the storage device is provided with a volatile storage device which is the above RAM and a nonvolatile auxiliary storage device such as a flash memory or the above ROM. Instead of the flash memory, an auxiliary storage device of a hard disk may be provided. The processor 3 executes a program inputted from the RAM and the ROM of the storage device 4. In this case, the program is inputted from the auxiliary storage device (e.g., ROM) to the processor 3 via the volatile storage device (e.g., RAM). The processor 3 may output data such as a calculation result to the volatile storage device (e.g., RAM) of the storage device 4, or may store such data into the auxiliary storage device via the volatile storage device. Of the functions in the function block diagram shown in FIG. 2, functions other than the storage unit 102 may be executed by the processor, the function of the storage unit 102 may be present in the storage device 4, and a part of the function of the storage unit 102 may be present in the processor 3. In addition to the above hardware, hardware for security, such as HSM, may be provided.

Control Process

Figure 6:
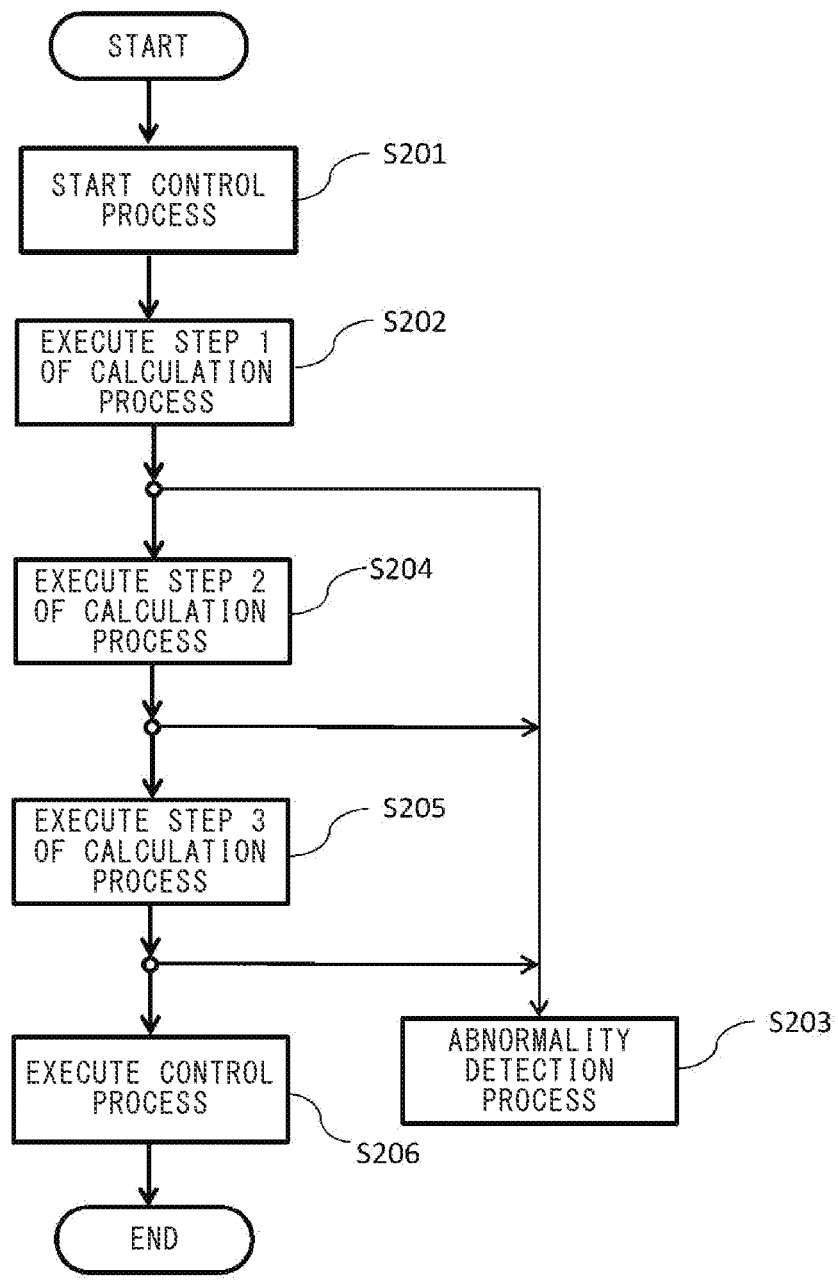
FIG. 6 is a flowchart for performing a control process of the control system according to embodiment 1 through three steps of a calculation process.

Next, the control process of the control device 10 will be described in detail with reference to FIG. 6. FIG. 6 is a flowchart showing a processing flow in which the control process of the control unit 100 is started, a control value is calculated through the calculation process including three calculation process steps of the calculation unit 101, and then the control process is executed, according to embodiment 1. As a matter of course, the number of the steps of the calculation process is not limited to three.

First, the control unit 100 starts the control process (step S201). In this control process, for example, the following are performed. (1) For calculating the control value in the calculation unit 101, various vehicle states (e.g., failure) for controlling the control target 2 are detected from the control device 10, the control device 20, or sensors connected thereto. (2) On the basis of the detected vehicle states, control program data corresponding to the control target 2 is read from the ROM and/or the RAM, and the calculation unit 101 is commanded to calculate the control value for controlling the control target 2.

The calculation unit 101 executes step 1 of the calculation process for calculating the control value (step S202). After step 1 is finished, the calculation unit 101 executes an abnormality detection process (step S203) and executes step 2 of the calculation process (step S204) in parallel.

Each step of the calculation process may be an instruction on an assembly-language basis or an instruction on a machine-language instruction-set basis, for causing the processor to execute one calculation, for example. In a case of obtaining one output through a plurality of calculations, the plurality of calculations may be regarded as one process step. For example, in a case where one output is obtained through combination of an arithmetic calculation instruction and a logical calculation instruction, the two instructions may be regarded as one calculation process step.

After step 2 of the calculation process is finished, the calculation unit 101 executes an abnormality detection process (step S203) and executes step 3 of the calculation process (step S205) in parallel.

After the calculation process is all finished, the control program is executed on the basis of the control value obtained through the calculation process, whereby the control unit 100 executes control for the control target 2 (step S206). Then, the control process is ended.

A more specific example will be described below.

(1) Through the control process in step S201, states a, b, c, d of sensors A, B, C, D are detected.

(2) Through the calculation process step 1 in step S202, a logical disjunction P of the state a of the sensor A and the state b of the sensor B is calculated and then an abnormality detection process is performed in step S203.

(3) Through the calculation process step 2 in step S204, a logical disjunction Q of the state c of the sensor C and the state d of the sensor D is calculated and then an abnormality detection process is performed in step S203.

(4) Through the calculation process step 3 in step S205, a logical conjunction m of the logical disjunction P and the logical disjunction Q is calculated and then an abnormality detection process is performed in step S203.

(5) In step S206, control M is executed for the control target 2 on the basis of the logical conjunction m.

Abnormality Detection Process

Figure 7:
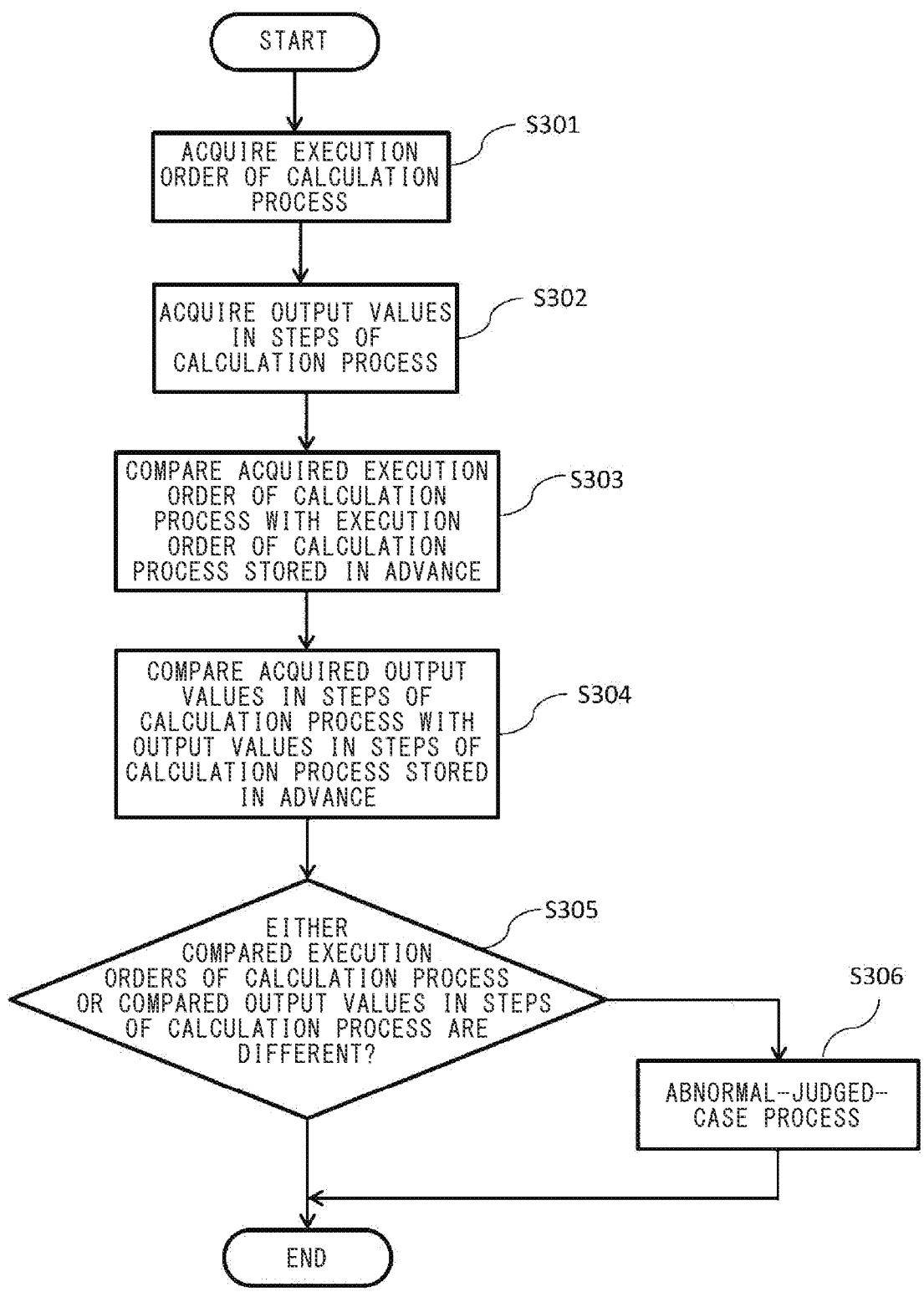
FIG. 7 is a flowchart illustrating an abnormality detection process in the control process of the control system according to embodiment 1.

Next, the abnormality detection process shown in FIG. 6 will be described in detail with reference to FIG. 7. FIG. 7 is a flowchart showing a processing flow from the start of control in the control unit 100 until detection of abnormality, according to embodiment 1.

As shown in steps S201 to S206 described above, the control unit 100 has started execution of the control process, and the calculation unit 101 has started the calculation process for calculating the control value for the control process.

The acquisition unit 103 acquires the execution order of the calculation process of the calculation unit 101 (step S301). The execution order may be, for example, an execution order based on individual instructions such as an arithmetic calculation instruction and a logical calculation instruction performed by the processor 3, or may be an execution order of only a specific kind of instruction, e.g., an arithmetic calculation instruction. In the above example, the execution order is the logical disjunction P, the logical disjunction Q, and the logical conjunction m.

The acquisition unit 103 acquires output values in the steps of the calculation process of the calculation unit 101 (step S302). In the above example, the output value (a+c) of the logical disjunction P, the output value (c+d) of the logical disjunction Q, and the output value (a+c)*(c+d) of the logical conjunction m, are acquired.

The comparison unit 104 compares the acquired execution order of the calculation process and the execution order of the calculation process stored in advance in the storage unit 102 (step S303).

The comparison unit 104 compares the acquired output values in the steps of the calculation process with the output values in the steps of the calculation process stored in advance in the storage unit 102 (step S304).

Whether or not either or both of the compared execution orders of the calculation process or the compared output values in the steps of the calculation process match each other, is judged (step S305). If at least either the compared execution orders or the compared output values are different from each other, an abnormal-judged-case process is performed (step S306). If both of the compared execution orders and the compared output values match each other, the abnormality detection process is ended.

If the judgment unit 105 judges that abnormality has occurred, a process for causing the vehicle to travel normally is subsequently performed as the abnormal-judged-case process. After the abnormal-judged-case process is finished, the abnormality detection process is ended.

Storage Process of Storage Unit 102

Figure 8:
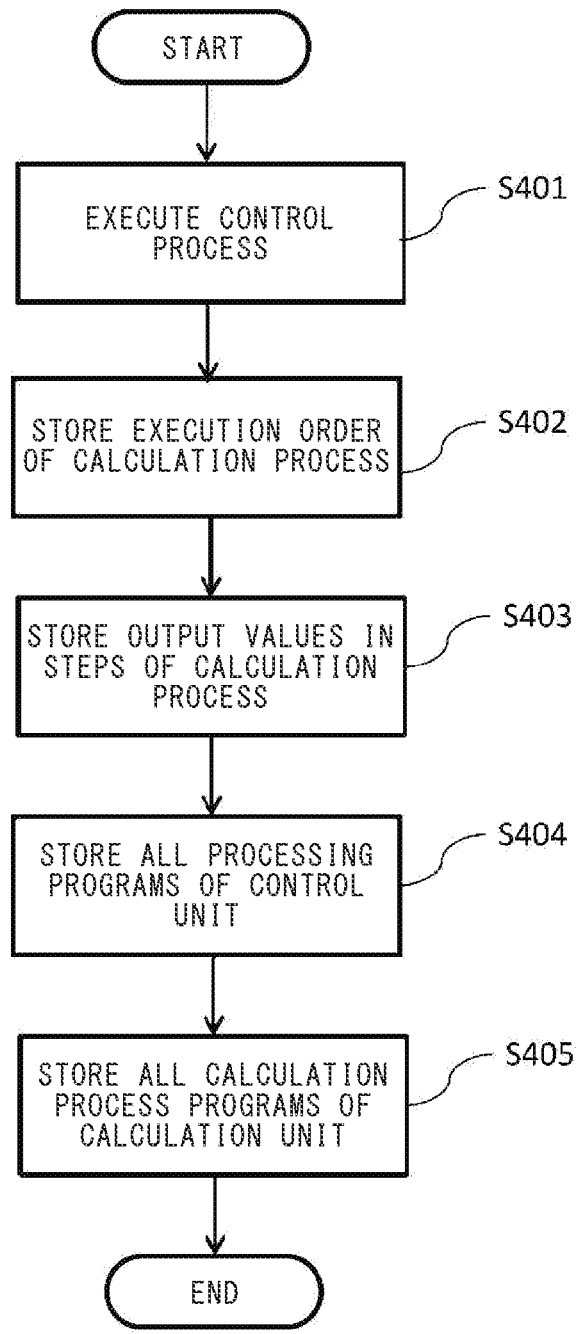
FIG. 8 is a flowchart showing a processing flow until an execution order of the calculation process of a calculation unit and output values in the steps in a case of normal operation of the control system according to embodiment 1 are stored in a storage unit.

Next, a storage process of the storage unit 102 before execution of the control process of the control unit 100 will be described in detail with reference to FIG. 8. FIG. 8 is a flowchart showing a processing flow until the execution order of the calculation process of the calculation unit 101 and output values in the steps of the calculation process in a case of normal operation of the control unit 100 are stored in the "normal-operation memory" in the storage unit 102, according to embodiment 1. This storage process is performed before shipping from a factory.

First, the control unit 100 starts to execute the control process. The calculation unit 101 starts the calculation process for calculating the control value for the control process (step S401).

The storage unit 102 stores the execution order of the calculation process of the calculation unit 101 (step S402).

The storage unit 102 stores output values in the steps of the calculation process of the calculation unit 101 (step S403).

The storage unit 102 stores all programs relevant to the control process to be performed in the control unit 100. In other words, all software pieces for executing the control process in the ROM and the RAM of hardware are stored (step S404).

The storage unit 102 stores all programs relevant to the calculation process to be performed in the calculation unit 101. In other words, all software pieces for executing the calculation process in the ROM and the RAM of hardware are stored (step S405).

As a storage process method, storage may be performed for each step, or may be performed at one time after the control process is all finished.

Determination Process by Determination Unit 106

Figure 9:
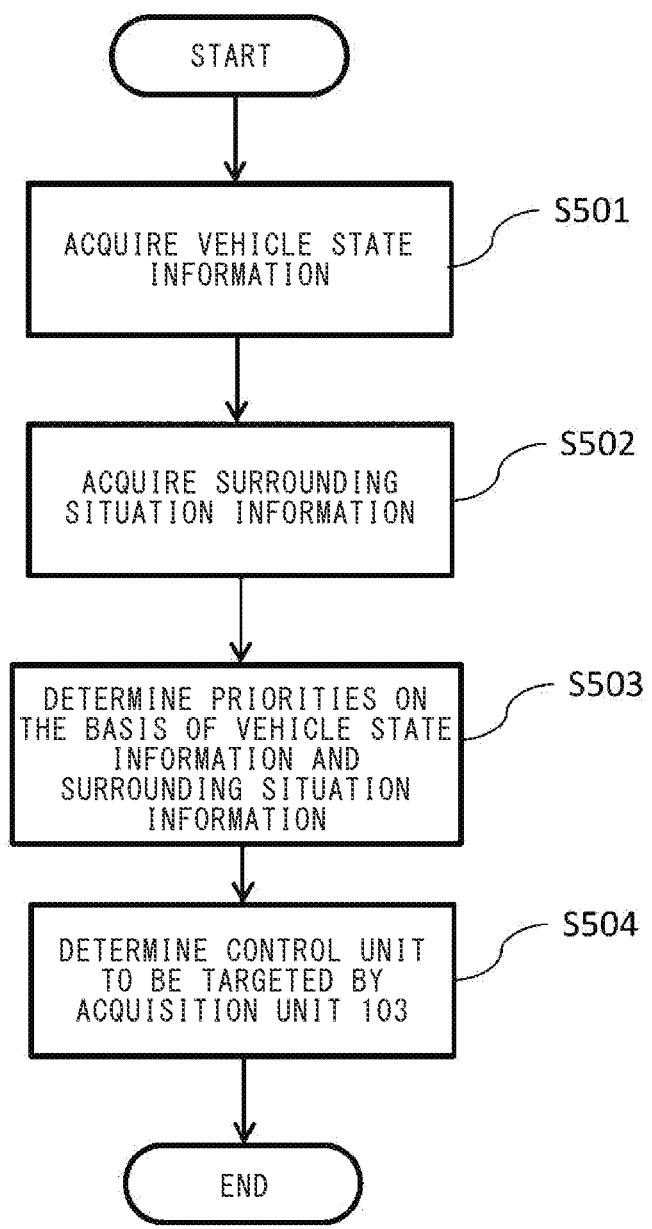
FIG. 9 is a flowchart of a determination process performed by a determination unit of the control system according to embodiment 1.

Next, a determination process performed by the determination unit 106 for determining the control unit 100 to be targeted by the acquisition unit 103 will be described in detail with reference to FIG. 9. FIG. 9 is a flowchart showing a flow of the determination process in which the determination unit 106 sets priorities on the basis of information from the vehicle state management unit 107 and the surrounding situation management unit 108 and then determines the control unit 100 to be targeted by the acquisition unit 103, according to embodiment 1. Here, it is assumed that a plurality of the control units 100 are present. The process may be executed constantly or on a certain condition. The certain condition may be a case of normal traveling, a case of traveling on an expressway, or the like.

The vehicle state management unit 107 acquires information about the operation state of the vehicle 1 (step S501). Specifically, this information indicates an operation state in which the vehicle "travels", "turns", or "stops". For the operation state, more detailed information may be added. For example, numerical information such as a vehicle speed or a vehicle tilt angle may be added. Such information may be acquired from a sensor connected to another control device (e.g., the control device 20 in FIG. 1) or the like.

The surrounding situation management unit 108 acquires surrounding situation information of the vehicle (step S502). Specifically, this information indicates the traffic condition, weather, or the like. The surrounding situation may be subdivided situation information. For example, weather may be represented by "sunny", "hot", "cloudy", "rainy", "heavy rain", "snowy", "heavy snow", "strong wind", "typhoon", and the like. Such information may be acquired from a reception device or a sensor connected to another control device (e.g., the control device 20 in FIG. 1).

The determination unit 106 determines priorities for the control units 100 to be targeted by the acquisition unit 103, on the basis of the vehicle state information from the vehicle state management unit 107 and the surrounding situation information of the vehicle from the surrounding situation management unit 108 (step S503). Specifically, if a damage influence when the control is taken over is greater, the priority is set to be higher. Examples of such processing are processing relevant to "traveling" at the time of sharply increasing the speed, processing relevant to "turning" in congestion, and processing relevant to "stopping" on a snowy road. As a prioritizing method, analysis is performed before shipping from a factory and the analysis result is reflected in the determination process of the determination unit 106. The content of the analysis result may be updated through over-the-air (OTA) update or the like.

The determination unit 106 determines, as the control unit 100 to be targeted by the acquisition unit 103, the control unit 100 for which the priority is determined to be highest (step S504), and then ends the determination process. Even when the priority is not highest, if it can be determined that there is a high risk in vehicle traveling, the abnormality detection process for the control unit 100 corresponding to such control may be performed first.

Abnormal-Judged-Case Process

Figure 10:
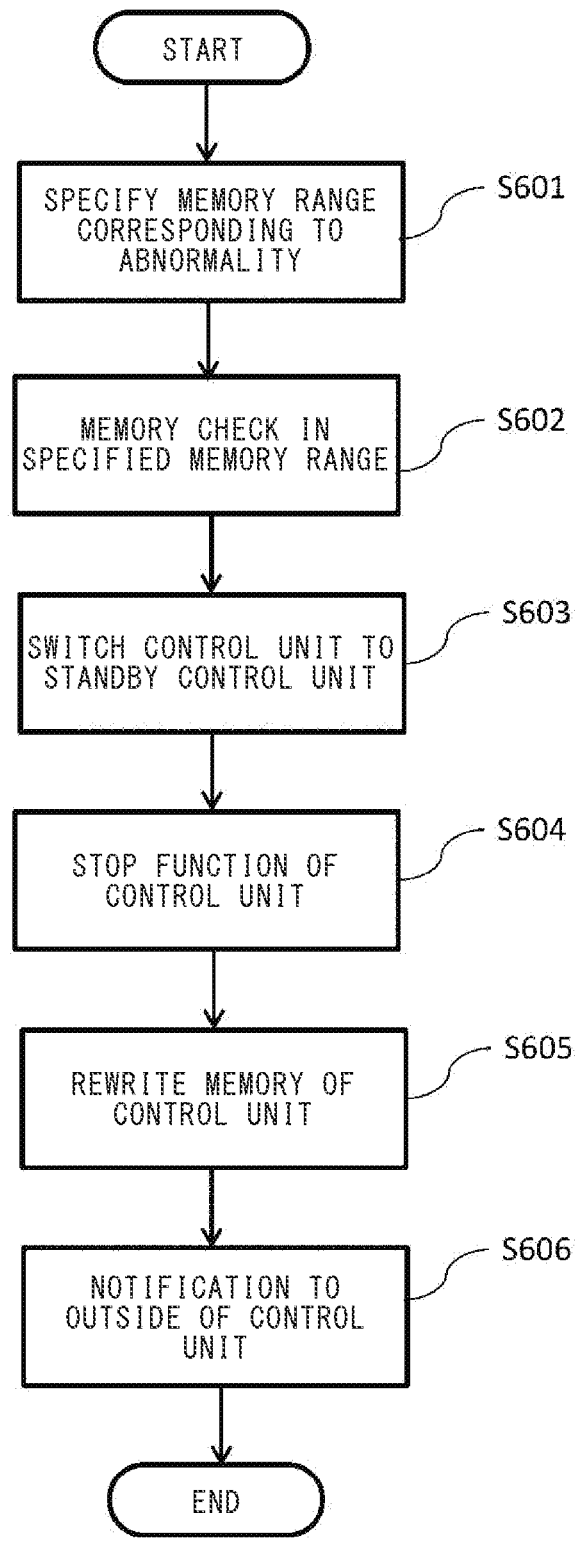
FIG. 10 is a flowchart illustrating an abnormal-judged-case process in the control system according to embodiment 1.

Next, the abnormal-judged-case process in FIG. 7 will be described in detail with reference to FIG. 10. FIG. 10 is a flowchart showing a flow of the abnormal-judged-case process.

If the judgment unit 105 judges that abnormality has occurred, the specifying unit 109 specifies a memory range as a cause for abnormality, from the execution order of the calculation process steps during execution stored in the "execution-case memory 1021" (see FIG. 4A to 4C) of the storage unit 102 (step S601). Specifically, a corresponding range in the memory relevant to the actual process stored in the storage unit 102, i.e., stored in the RAM and/or the ROM, is read and specified.

The memory examination unit 110 performs memory check as to whether the range specified by the specifying unit 109 matches the memory stored in the storage unit 102, and detects a range including difference (step S602).

If the judgment unit 105 judges that abnormality has occurred, the switch unit 112 switches the control process of the control unit 100 to the control process of the standby control unit 111 (step S603).

The switch unit 112 stops the control process of the control unit 100 or brings the function thereof partially into a fallback state (step S604).

After the switch unit 112 switches the control process of the control unit 100 to the control process of the standby control unit 111, the rewriting unit 113 rewrites the difference-included range of the memory detected by the memory examination unit 110 and stored in the storage unit 102, into the ROM and/or the RAM (step S605).

The notification unit 114 sends information indicating judgment as abnormality by the judgment unit 105 and the rewrite result of the rewriting unit 113, to outside of the control device 10 and then the abnormal-judged-case process is ended. As a notification method, the abnormality information and the rewrite result are sent at the same time (step S606). Alternatively, they may be sent separately from each other. A notification destination may be a driver who may be warned through a display screen.

In embodiment 1 described above, the example in which the control system according to the present disclosure is used as an on-vehicle control system has been shown. However, the control system according to the present disclosure is not limited thereto. For example, this control system can be used as a control system of a control device connected to a communication line, which has a high security strength and requires a configuration for immediately detecting abnormality in the control device.

Embodiment 1 according to the present disclosure described above provides the following effects in the control process.

Abnormality in the control process is detected through comparison as to whether or not the execution order of a calculation process for a control value to be used in the control process and output values in the steps of the calculation process match those in the normal-operation case. Thus, without limitation to a detection method specialized for a processing order or a control value based on communication data, even if a control value or a processing order is made to pretend to be correct by an unknown cyberattack, abnormality can be detected.

In addition, comparison as to whether or not the execution order of the calculation process for the control value to be used in the control process and the output values in the steps of the calculation process match those in the normal-operation case, is performed every time when each step is finished, whereby it is possible to immediately detect abnormality in the control process before the control process is finished.

In addition, the standby control unit capable of performing the same control as the control process of the control unit is provided, and if the control unit is judged to be abnormal, the control process is switched to the standby control unit. Thus, normal traveling can be kept.

In addition, priorities are set for the control units to be targeted in the abnormality detection process, whereby the control process to be prioritized is determined. Thus, it is possible to preferentially address a process that will greatly suffer a damage influence by a cyberattack, and the damage can be reduced to a minimum level. In addition, the processing load can be reduced as compared to a case of performing the abnormality detection process for all the control processes.

In addition, the operation state of the vehicle is managed, and priorities are set for the control units to be targeted in the abnormality detection process on the basis of the operation state of the vehicle, whereby the control process to be prioritized is determined. Thus, it is possible to preferentially address a control process that will greatly suffer a damage influence when the control is taken over, in terms of vehicle operation.

In addition, the surrounding situation of the vehicle is managed, and priorities are set for the control units to be targeted in the abnormality detection process on the basis of the surrounding situation of the vehicle, whereby the control process to be prioritized is determined. Thus, it is possible to preferentially address a control process that will greatly suffer a damage influence when the control is taken over, in terms of the surrounding circumstances or the traffic condition.

In addition, if it is judged that the control process is abnormal, the memory range as a cause for abnormality is specified from the execution order of the calculation process. Thus, in a case of detecting an abnormal part of the memory through memory check, it is possible to perform memory check partially, without checking the entire memory, whereby memory check processing can be performed efficiently.

In addition, if it is judged that the control process is abnormal, memory check is performed in a specified memory range, to detect a range including difference from the memory stored in a case of normal operation of the control process. Thus, it is possible to detect a position in a memory where falsification is made by an unknown cyberattack.

In addition, if it is judged that the control process is abnormal, the control process is switched to the control process of the standby control unit, and the memory is rewritten for the range including difference from the memory stored in a case of normal operation of the control process. Thus, it is possible to cope so as not to allow a new backdoor to be made.

In addition, information indicating judgment as abnormality of the control process and the rewrite result are sent to outside of the control device. Thus, it is possible to immediately notify the driver that a cyberattack has been performed. Further, the driver notified of the attack can immediately examine the vehicle.

Although the disclosure is described above in terms of an exemplary embodiment, it should be understood that the various features, aspects, and functionality described in the embodiment are not limited in their applicability to the particular embodiment with which they are described, but instead can be applied alone or in various combinations to the embodiment of the disclosure.

It is therefore understood that numerous modifications which have not been exemplified can be devised without departing from the scope of the present disclosure. For example, at least one of the constituent components may be modified, added, or eliminated.

DESCRIPTION OF THE REFERENCE CHARACTERS 10 control device
100 control unit
101 calculation unit
102 storage unit
103 acquisition unit
104 comparison unit
105 judgment unit
106 determination unit
107 vehicle state management unit
108 surrounding situation management unit
109 specifying unit
110 memory examination unit
111 standby control unit
112 switch unit
113 rewriting unit
114 notification unit

The invention claimed is:

1. A control system comprising:
at least one processor that
execute a control process of a control device;
calculates a control value for the control process through a plurality of steps of a calculation process;
a storage in which normal-case information about an execution order of the calculation process and output values in the steps of the calculation process are stored in advance;
wherein the at least one processor
acquires execution-case information about the execution order of the executed calculation process and output values in the steps of the executed calculation process;
compares the normal-case information and the execution-case information; and
judges that abnormality has occurred, if at least either the compared execution orders of the calculation process or the compared output values in the steps of the calculation process are different from each other.

2. The control system according to claim 1, wherein
every time when each of the plurality of steps of the calculation process is finished, the at least one processor compares the execution orders of the calculation process and the output values for each of the steps of the calculation process, and if at least either the compared execution orders or the compared output values are different from each other, the at least one processor judges that abnormality has occurred in the at least one processor.

3. The control system according to claim 2, wherein:
the at least one processor comprises a first processor that performs the control process, and a second processor that is separate from the first processor and is capable of performing the same control as the first processor; and the control system further comprises a switch which switches the control process of the first processor to the control process of the second processor if the judgment circuitry judges that abnormality has occurred.

4. The control system according to claim 3, wherein, when the abnormality has occurred, the at least one processor specifies an abnormality range of the execution order of the calculation process stored in the storage.

5. The control system according to claim 2, wherein
the at least one processor comprises a plurality of processors,
the control system sets priorities for the plurality of processor, and
acquires the execution order of the plurality of steps of the calculation process for calculating the control value for the control process of a processor having a highest priority among the plurality of processors, and the output values in these steps of the calculation process.

6. The control system according to claim 5, wherein, when the abnormality has occurred, the at least one processor specifies an abnormality range of the execution order of the calculation process stored in the storage.

7. The control system according to claim 2, wherein, when the abnormality has occurred, the at least one processor specifies an abnormality range of the execution order of the calculation process stored in the storage.

8. The control system according to claim 1, wherein:
the at least one processor comprises a first processor that performs the control process, and a second processor that is separate from the first processor and is capable of performing the same control as the first processor; and
the control system further comprises a switch which switches the control process of the first processor to the control process of the second processor if the judgment circuitry judges that abnormality has occurred.

9. The control system according to claim 8, wherein, when the abnormality has occurred, the at least one processor specifies an abnormality range of the execution order of the calculation process stored in the storage.

10. The control system according to claim 1, wherein
the at least one processor comprises a plurality of processors,
the control system sets priorities for the plurality of processors, and
acquires the execution order of the plurality of steps of the calculation process for calculating the control value for the control process of a processor having a highest priority among the plurality of processors, and the output values in these steps of the calculation process.

11. The control system according to claim 10, wherein the control device is provided in a vehicle, and the control system sets the priorities for the plurality of processors based on an operation state of the vehicle.

12. The control system according to claim 11, wherein the control device is provided in the vehicle, and the control system sets the priorities for the plurality of processors based on an operation state of the vehicle.

13. The control system according to claim 12, wherein, when the abnormality has occurred, the at least one processor specifies an abnormality range of the execution order of the calculation process stored in the storage.

14. The control system according to claim 11, wherein, when abnormality has occurred, the at least one processor specifies an abnormality range of the execution order of the calculation process stored in the storage.

15. The control system according to claim 10, wherein the control device is provided in a vehicle, and the control system sets the priorities for the plurality of processors based on a surrounding situation of the vehicle.

16. The control system according to claim 15, wherein, when the abnormality has occurred, the at least one processor specifies an abnormality range of the execution order of the calculation process stored in the storage.

17. The control system according to claim 10, wherein, when the abnormality has occurred, the at least one processor specifies an abnormality range of the execution order of the calculation process stored in the storage.

18. The control system according to claim 1, wherein:
when abnormality has occurred, the at least one processor specifies an abnormality range of the execution order of the calculation process stored in the storage.

19. The control system according to claim 18, wherein the storage stores the execution-case information, and the at least one processor detects a part including difference between the execution-case information and the normal-case information, in the abnormality range.

20. The control system according to claim 19, wherein:
the at least one processor comprises a first processor that performs the control process, and a second processor that is separate from the first processor and capable of performing the same control as the first processor;
the control system further comprises a switch which switches the control process of the first processor to the control process of the second processor if the judgment circuitry judges that abnormality has occurred; and
the part including the difference is rewritten into the normal-case information, after the switch switches the control process of the first processor to the control process of the second processor.

21. The control system according to claim 20, further comprising a display screen which display information about the abnormality and a result of rewriting the part including the difference into the normal-case information.

* * * * *